United States Patent [19]

Staphan

[11] 4,109,977
[45] Aug. 29, 1978

[54] RESILIENTLY MOUNTED RADIAL AND AXIAL BEARINGS

[75] Inventor: Gerard Staphan, Croissy, France

[73] Assignee: Nadella, Rueil-Malmaison, France

[21] Appl. No.: 789,241

[22] Filed: Apr. 20, 1977

[30] Foreign Application Priority Data

Apr. 30, 1976 [FR] France .................................. 76 12915

[51] Int. Cl.² .................................................. F16C 19/14
[52] U.S. Cl. .................................. 308/174; 308/184 R
[58] Field of Search ............... 308/174, 175, 176, 184, 308/187.1, 187.2, 187, 216, 36.1, 207, 219, 26, 35, 238, 236

[56] References Cited

U.S. PATENT DOCUMENTS

| 2,208,724 | 7/1940 | Griswold | 308/174 |
| 3,632,178 | 1/1972 | Pitner | 308/174 |
| 3,934,956 | 1/1976 | Pitner | 308/174 |

FOREIGN PATENT DOCUMENTS 1,223,471  2/1971  United Kingdom ..................... 308/184

*Primary Examiner*—Trygve M. Blix
*Assistant Examiner*—Douglas C. Butler
*Attorney, Agent, or Firm*—Littlepage, Quaintance, Murphy, Richardson and Webner

[57] ABSTRACT

A bearing assembly is formed of an elastic sleeve in a bore, a radial roller bearing in the bore supporting a shaft in the bore, and a thrust bearing in the sleeve and axially abutting the radial bearing.

18 Claims, 5 Drawing Figures

RESILIENTLY MOUNTED RADIAL AND AXIAL BEARINGS

The present invention relates to a bearing device of the type comprising a radial bearing disposed within an elastic, vibration-absorbing sleeve.

Another possible function of the sleeve resides in the establishing of a certain radial play as described, for example, in U.K. Patent No. 1,204,156 and U.S. Pat. No. 3,883,194 in the name of the applicants.

The assemblies utilizing such bearings are frequently subjected to axial loads which generally necessitate the addition of a separate thrust bearing.

However, the use of two separate bearings presents the drawback of necessitating the handling and fitting of several part with the consequence of an increase of the duration of the operation and the danger of a defective assembly incompatible with the use of a large-series assembly line.

Moreover, it is tempting to use the sleeve to absorb the vibrations transmitted by the thrust bearing, unless the latter is harmful to good operation of the radial bearing.

Finally, for reasons of simplicity of assembly, it is desirable to avoid the necessity of providing a radial support shoulder for the thrust bearing in the body of the support intended to receive the bearing assembly.

Thus the purpose of the present invention is to reconcile all of the above-mentioned requirements by the use of a bearing device of the type comprising a radial bearing which includes an elastic sleeve of generally cylindrical form intended to be force-fitted in a bore, and within which there is engaged a thin bush, the internal surface of which serves as race for cylindrical rolling elements. The bearing also comprises, likewise disposed within the sleeve, at least one thrust bearing the bearing plate of which is intended to abut against an element of the radial bearing, the said abutment being situated entirely within the cylinder defined by the said bore.

Thus the invention takes the form of a combined bearing disposed entirely in a sleeve intended to be fitted simply in the bore of a support which does not necessarily comprise a radial shoulder.

According to a first characteristic of the invention, the said plate abuts directly against a radial face of the bush.

According to a second characteristic of the invention, the bush and/or the sleeve are formed in such manner that by their cooperation they ensure a continuous take-up of the radial play.

According to another characteristic of the invention, the plate is in the form of an L in cross section, having an axial flange which terminates with a radial collar oriented towards the axis ensuring its assembling with the cage of the thrust bearing.

According to yet a further characteristic of the invention, the internal race of the radial bearing is constituted by a ring provided with a radial flange which constitutes the counter-plate of the thrust bearing.

Further characteristics and advantages of the present invention will appear more clearly from the description which follows of several forms of embodiment given solely by way of examples and represented in the accompanying drawings, wherein.

Figure 1:
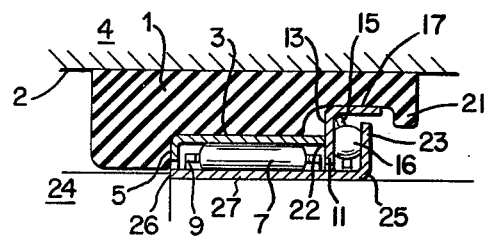
FIG. 1 represents the assembly of a device according to a first form of embodiment of the invention.

FIG. 1 represents in axial section a first form of embodiment according to which in an elastic sleeve 1 made of elastomeric material, for example, and intended to be force-fitted or to adhere in the bore 2 of a support 4 there is disposed a thin bush 3. This bush is provided with a radial flange 5, and the internal surface serves as a race for cylindrical rolling elements 7 constituted by needles or rollers maintained and guided by a cage 9, the axial displacement of which in a direction opposite to the flange 5 is limited by the extremity of a thrust bearing plate 13. The thrust bearing is composed of cylindrical rolling elements 16 in an axial cage 15, the said plate 13 having a general L-form in cross section. The axial portion 17 on plate 13 is guided by the internal surface of the sleeve which in this region is equipped with a radial flange 21 while the radial portion 11 is intended to abut against the end 22 of the bush 3. The said abutment 22 is disposed entirely within the cylinder defined by the sleeve 1 and thus in said bore is situated preferably in line with the central zone of the needles or rollers 16.

The assembly thus described constitutes a combined bearing, the radial and axial functions of which are separated in order to avoid all mutual impairment in operation, and is disposed entirely within the sleeve in order to constitute a single unit capable of being handled and fitted as such in the bore 2.

The counter-plate of the thrust bearing is constituted by the radial portion 23 of a ring 25, the axial part 27 of which is fitted on the shaft 24 mounted on the bearing and, if necessary, is supported axially by a shoulder 26, which serves as an internal race for the elements 7 and constitutes a part of the combined bearing.

The radial flange 21 of the sleeve 1 permits assembling the elements of the thrust bearing, possibly equipped with its counter-plate and its support, in the elastomer body; it can also act as a seal.

The vibration-absorbing elastic sleeve 1 is capable of fulfilling a second function consisting in the establishment of a certain radial play as described and illustrated in U.K. Pat. No. 1,204,156 and U.S. Pat. No. 3,883,194, likewise in the name of the applicants. Thus according to a first form of embodiment described in the first document, the sleeve 1 possesses three zones of extra thickness which, being crushed in contact with the bore, are deformed inwards at the same time, likewise deforming the bush 3 in three zones.

According to a second preferred form of embodiment, described in the U.S. Pat. No. 3,883,194, the thin sleeve 3 offers the bearing elements a reduced or zero circulation play at angularly spaced zones, ensuring a permanent take-up of the radial play.

Of course, other arrangements can be foreseen to obtain the desired result, as for example the use in the sleeve 1 of at least one brush 3, the cylindrical part of which is provided with a slot.

Figure 2:
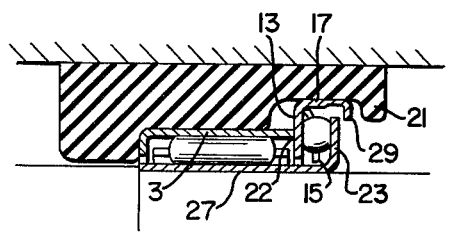
FIG. 2 represents a first variant of FIG. 1.

FIG. 2 represents a variant of the FIG. 1, according to which the axial portion 17 of the thrust plate 13 terminates with a radial collar 29, which ensures assembling both in the axial and the radial directions of the plate and of the cage 15 and preferably with the counter-plate 23.

Figure 3:
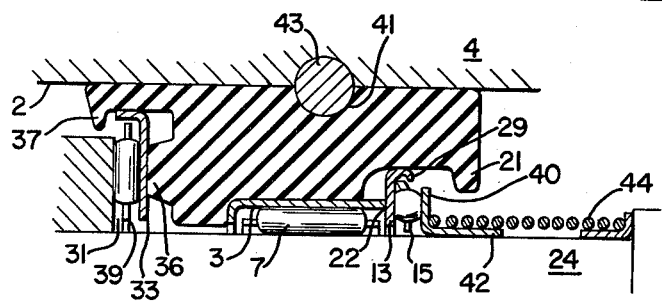
FIG. 3 represents the preceding device to which a second thrust bearing has been added.

FIG. 3 represents the assembly according to FIG. 2, to which there has been added a second thrust bearing 31 intended to absorb axial loads directed in a second direction, the plate 33 of the said thrust abutting against a shoulder 36 situated within the bore 2 or the cylinder defined by said bore and provided on the radial face of the sleeve 1, which comprises a second radial flange 37 intended to support the cage 39 and the plate 33 of this second thrust bearing. According to this variant, the collar 29 effects the assembling of the plate 13 and the cage 15, while the counter-plate is constituted by an attached piece 40 on collar 29, one portion 42 of which is fixed on the shaft 24 by means 44 permitting adjustment.

In such an arrangement a recess 41 is provided in the body of the sleeve to ensure, in cooperation with a key 43 for example, the maintaining of the bearing assembly in the support 4.

Figure 4:
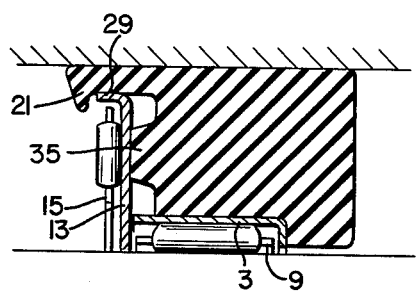
FIG. 4 represents a second variant of the device according to the invention.

FIG. 4 represents another variant of FIG. 1 according to which the plate 13 of the single thrust bearing abuts against a shoulder 35 provided in the body of the sleeve, a radial flange 21 of which ensures the assembling of the elements of the thrust bearing.

Figure 5:
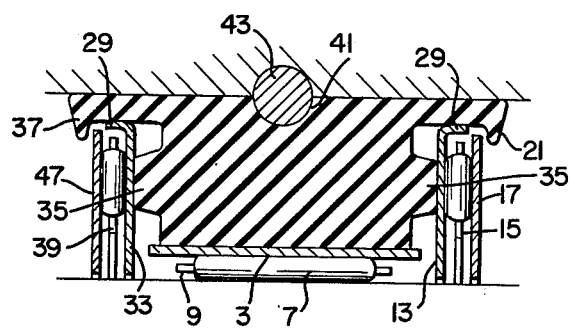
FIG. 5 represents another variant comprising two thrust bearings.

FIG. 5 represents another combined bearing capable of supporting axial loads in two opposite directions and comprising two thrust bearings abutting each upon a shoulder 35 of the body of the sleeve, and the elements of which possibly comprising the counter-plates 47 are kept assembled by the radial flanges 21 and 37 respectively. The friction of the cylindrical wall of the bush 3 against the elastomer permits of ensuring its axial position; it is, however, possible to provide its fixing in the sleeve by adhesion or by any other known means.

The invention is not, of course, in any way limited to the forms of embodiment as described, which have been given only by way of example, but covers the variants of embodiment and the technical equivalents of the described means.

What is claimed is:

1. A bearing assembly for supporting a rotating member in a bore, comprising a resilient sleeve of elastomeric material having an axially extending peripheral surface to be received in said bore, a radial bearing having a bush fixed within said sleeve and cylindrical rolling elements rotatable within said bush, and an axial thrust bearing within said sleeve radially inwardly of said peripheral surface having a radial plate and rolling elements rotatable on said radial plate, said plate abutting one end of said bush within said sleeve.

2. An assembly according to claim 1, in which said radial bearing includes a cage for said rolling elements and a portion of the plate constitutes an axial arresting stop for the cage of the radial bearing.

3. An assembly according to claim 1, in which the plate has an axial peripheral flange which engages inside the sleeve and which terminates in a radial collar oriented towards the axis of the sleeve, ensuring its assembly with the thrust bearing.

4. An assembly according to claim 1, in which the radial bearing is provided with an inner race in the form of a ring having a radial portion forming a counter-plate opposed to said radial plate of the thrust bearing.

5. An assembly according to claim 4, in which the thrust bearing includes a cage and said collar ensures the assembly of the cage and the counterplate of the thrust bearing.

6. An assembly according to claim 1, in which a second thrust bearing is provided to take axial load in a second direction, said second thrust bearing having a radial plate which abuts a portion of the sleeve.

7. An assembly according to claim 6, in which the sleeve comprises at least one radial flange intended to ensure the support, both radially and axially, of the thrust bearing.

8. A bearing assembly as claimed in claim 1, in which said sleeve has an abutment on the end adjacent said radial plate and between said bush and the outer surface of said sleeve.

9. A bearing assembly as claimed in claim 1, in which said radial bearing includes a cylindrical internal race on which said rolling elements rotate, and said internal race carries a second radial plate on one end to form a race for said rolling elements rotatable on said first radial plate, so that the plates act as races for said rolling elements of said axial bearing, said radial plates being confined within said sleeve.

10. A bearing assembly as claimed in claim 9, in which said first radial plate has a cylindrical flange on its outer periphery which extends axially around said thrust bearing, and said sleeve surrounds said cylindrical flange and is formed with an inwardly extending radial flange on its end outwardly of said thrust bearing.

11. A bearing assembly for supporting a rotating body in a bore, comprising a resilient sleeve of elastomeric material having an axially extending peripheral surface to be fitted into a bore, radial bearing having a cylindrical bush fitted in said sleeve with a radial flange on one end and cylindrical radial bearing members rotatable in said bush, an axial thrust bearing in said sleeve radially inwardly of said peripheral surface and adjacent the end of said bush opposite said flange, said axial bearing having a first radial bearing plate abutting the end of said bush opposite said flange, and a plurality of bearing members rotatable on said first radial plate, and an internal race for said radial bearing members adapted to support the rotating body and having a flange forming a second radial plate on one end engaging said axial thrust bearing and opposed to said first radial plate to confine said axial bearing between said first and second plates.

12. A bearing unit comprising a resilient vibration-absorbing sleeve of elastomeric material having an axially extending peripheral surface and having within said peripheral surface of the sleeve a radial bearing and an axial-thrust bearing, the radial bearing including a thin bush fitted in the sleeve and providing an outer race for cylindrical rolling elements of the radial bearing, and the axial-thrust bearing including a radial disc which forms the thrust bearing race nearer the radial bearing and which is axially beyond the rolling elements of the radial bearing and extends radially to overlap the rolling elements to limit possible axial displacement of the elements, said unit including an abutment engageable by said disc carried by said sleeve on the end adjacent said disc.

13. A resilient bearin assembly for two coaxial relatively rotating members comprising an elastic body of elastomeric material between said members having inner and outer peripheral surfaces, said body being fixed to one of said members along one peripheral surface and a radial bearing and an axial thrust bearing between the other periphery of said body and said other rotating member, said radial bearing having an axial, concentric bush fixed on said elastic body forming a race for said radial bearing, said axial thrust bearing having a radial plate between said two rotating members adjacent one end of said radial bearing, said radial plate engaging an axial abutment fixed on said elastic body, so that said elastic body between said relatively rotating members resiliently resists radial and axial forces transmitted by said bearings between said members.

14. A resilient bearing assembly as claimed in claim 13, in which said axial abutment is formed by the end of said axial bush.

15. A resilient bearing assembly as claimed in claim 13, in which said axial abutment is formed by an axial projection of elastic material of said elastic body.

16. A resilient bearing assembly as claimed in claim 13, in which said radial plate is provided with an axial flange in engagement with said elastic body and said elastic body extends past said radial plate and is formed with a radial flange to overlie the axial flange on said radial plate.

17. A resilient bearing assembly as claimed in claim 16, in which said axial flange on said radial plate is formed with a radial collar (29) extending toward said other rotating member.

18. A bearing assembly for supporting a rotating member in a bore, comprising a resilient sleeve of elastomeric material having an axially extending peripheral surface to be received in said bore, a radial bearing having a bush fixed in said sleeve, an axial thrust bearing within said sleeve radially inwardly of said peripheral surface having a radial plate forming a race for said axial thrust bearing, said assembly including integral, axially projecting abutment means on said resilient sleeve engageable by said radial plate, said resilient sleeve between said bore and rotating member transmitting radial and axial forces.

* * * * *